United States Patent
Chen et al.

(10) Patent No.: US 7,944,655 B2
(45) Date of Patent: May 17, 2011

(54) ELECTROSTATIC DISCHARGE PROTECTION CIRCUIT EMPLOYING A MICRO ELECTRO-MECHANICAL SYSTEMS (MEMS) STRUCTURE

(75) Inventors: Tze Wee Chen, Stanford, CA (US); William Loh, Fremont, CA (US); Choshu Ito, San Mateo, CA (US)

(73) Assignee: LSI Corporation, Milpitas, CA (US)

( * ) Notice: Subject to any disclaimer, the term of this patent is extended or adjusted under 35 U.S.C. 154(b) by 470 days.

(21) Appl. No.: 12/128,108

(22) Filed: May 28, 2008

(65) Prior Publication Data
US 2009/0296292 A1    Dec. 3, 2009

(51) Int. Cl.
*H02H 9/00* (2006.01)
(52) U.S. Cl. ......................................................... 361/56
(58) Field of Classification Search ...................... 361/56
See application file for complete search history.

(56) References Cited

U.S. PATENT DOCUMENTS

| | | | |
|---|---|---|---|
| 5,946,176 A | 8/1999 | Ghoshal | |
| 6,646,215 B1* | 11/2003 | Nelson | 200/181 |
| 6,813,122 B1* | 11/2004 | Granstrom | 360/323 |
| 6,847,266 B2* | 1/2005 | Laney et al. | 333/12 |
| 7,105,852 B2* | 9/2006 | Moddel et al. | 257/30 |
| 7,679,872 B2* | 3/2010 | Kawa et al. | 361/56 |
| 2005/0012562 A1* | 1/2005 | Shin | 333/105 |
| 2005/0115811 A1* | 6/2005 | Receveur et al. | 200/243 |
| 2009/0296292 A1* | 12/2009 | Chen et al. | 361/56 |

* cited by examiner

*Primary Examiner* — Ronald W Leja
(74) *Attorney, Agent, or Firm* — Otterstedt, Ellenbogen & Kammer, LLP

(57) ABSTRACT

An ESD protection circuit for protecting a host circuit coupled to a signal pad from an ESD event occurring at the signal pad includes at least one MEMS switch which is electrically connected to the signal pad. The MEMS switch includes a first contact structure adapted for connection to the signal pad, and a second contact structure adapted for connection to a voltage supply source. The first and second contact structures are coupled together during the ESD event for shunting an ESD current from the signal pad to the voltage supply source. The first and second contact structures are electrically isolated from one another in the absence of the ESD event. At least one of the first and second contact structures includes a passivation layer for reducing contact adhesion between the first and second contact structures.

18 Claims, 3 Drawing Sheets

ELECTROSTATIC DISCHARGE PROTECTION CIRCUIT EMPLOYING A MICRO ELECTRO-MECHANICAL SYSTEMS (MEMS) STRUCTURE

FIELD OF THE INVENTION

The present invention relates generally to semiconductor devices, and more particularly relates to electrostatic discharge (ESD) protection circuitry.

BACKGROUND OF THE INVENTION

An ESD protection circuit used in an integrated circuit (IC) is a circuit designed to protect other circuitry (e.g., host circuit) on the IC from being damaged by an ESD event. Generally, an ESD event is a single-event, rapid transfer of electrostatic charge between two objects, usually resulting when two objects at different potentials come into direct contact with one another. ESD can also occur when a high electrostatic field develops between two objects in close proximity. ESD is one of the major causes of device failures in the semiconductor industry.

An ESD protection circuit is typically directly coupled to the host circuit to be protected but remains turned off until triggered by the ESD event. Although the ESD protection circuit is preferably turned off during normal operation of the host circuit, the ESD protection circuit includes parasitic elements which can adversely impact the operation and performance of the host circuit, such as, for example, via parasitic loading of input and/or output nodes in the host circuit. Furthermore, parasitic loading attributable to the ESD protection circuit is not easily modeled and simulated, thereby making it difficult to predict the impact of the ESD protection circuit on host circuit performance.

Accordingly, there exists a need for an improved ESD protection circuit that does not suffer from one or more of the above-described problems associated with conventional ESD protection circuitry.

SUMMARY OF THE INVENTION

Illustrative embodiments of the present invention meet the above-noted need by providing techniques for advantageously protecting a host circuit in an IC from an ESD event without significantly degrading performance of the host circuit, such as, for example, by parasitic loading, and without unintended interactions between the host circuit and ESD protection circuitry included in the IC. In order to accomplish this, embodiments of the invention beneficially provide an ESD protection circuit employing a MEMS switch.

In accordance with one aspect of the invention, an ESD protection circuit for protecting a host circuit coupled to a signal pad from an ESD event occurring at the signal pad includes at least one MEMS switch which is electrically connected to the signal pad. The MEMS switch includes a first contact structure adapted for connection to the signal pad, and a second contact structure adapted for connection to a voltage supply source. The first and second contact structures are coupled together during the ESD event for shunting an ESD current from the signal pad to the voltage supply source. The first and second contact structures are electrically isolated from one another in the absence of the ESD event. At least one of the first and second contact structures includes a passivation layer for reducing contact adhesion between the first and second contact structures.

In accordance with another aspect of the invention, a method for protecting a host circuit coupled to a signal pad from an ESD event occurring at the signal pad is provided. The method includes the steps of: during the ESD event, shunting a current generated during the ESD event from the signal pad to a voltage supply source via at least one micro electro-mechanical systems (MEMS) switch, the at least one MEMS switch including first and second contact structures, at least one of the first and second contact structures comprising a passivation layer for reducing contact adhesion between the first and second contact structures; and electrically isolating the first and second contact structures from one another in absence of the ESD event.

In accordance with yet another aspect of the invention, an improved MEMS switch is provided. The MEMS switch includes first and second contact structures. The first and second contact structures are electrically coupled together in response to an applied electrostatic, capacitive and/or piezoelectric force. At least one of the first and second contact structures includes a passivation layer formed thereon adapted to reduce contact adhesion between the first and second contact structures.

These and other features, objects and advantages of the present invention will become apparent from the following detailed description of illustrative embodiments thereof, which is to be read in connection with the accompanying drawings.

DETAILED DESCRIPTION OF THE INVENTION

Figure 1:
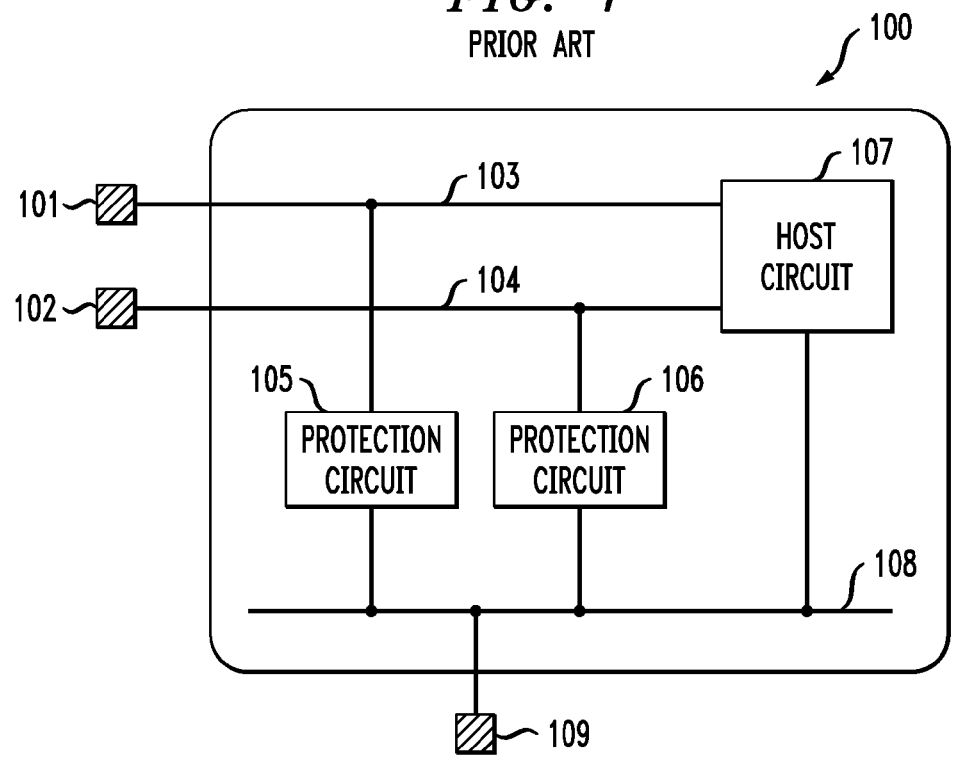
FIG. 1 is a block diagram depicting at least a portion of an illustrative IC having standard ESD protection.

In the following detailed description, same reference numerals in the corresponding drawings are used to define like elements throughout the several views. Particularly with respect to IC fabrication, it is emphasized that the descriptions provided herein are not intended to encompass all of the processing steps which may be required to successfully form a functional integrated circuit device. Rather, certain processing steps which are conventionally used in forming integrated circuit devices, such as, for example, wet cleaning and annealing steps, are purposefully not described herein for economy of description. However one skilled in the art will readily recognize those processing steps omitted from these generalized descriptions. Moreover, details of the process steps used to fabricate such integrated circuit devices may be found in a number of publications, for example, S. Wolf and R. N. Tauber, *Silicon Processing for the VLSI Era, Volume 1*, Lattice Press, 1986 and S. M. Sze, *VLSI Technology, Second Edition*, McGraw-Hill, 1988, both of which are incorporated herein by reference.

It should also be understood that the various layers and/or regions shown in the accompanying figures are not necessarily drawn to scale, and that one or more semiconductor layers and/or regions of a type commonly used in such integrated circuit devices may not be explicitly shown in a given figure for ease of explanation. This does not imply that the semiconductor layers and/or regions not explicitly shown are omitted from the actual integrated circuit device.

The present invention will be described herein in the context of exemplary ESD protection circuits and novel MEMS switches for use therein. It is to be understood, however, that techniques of the present invention are not limited to the circuits shown and described herein. Nor are techniques of the invention limited to an ESD protection application. Rather, embodiments of the invention, in accordance with one aspect thereof, are directed to techniques for reducing parasitic interaction of an ESD protection circuit with a host circuit to be protected. In accordance with another aspect, embodiments of the invention are directed to an improved MEMS switch for selectively connecting circuit blocks and/or circuit elements in an IC. Although preferred embodiments of the invention may be fabricated in a silicon wafer, embodiments of the invention can alternatively be fabricated in wafers comprising other materials, including but not limited to gallium arsenide (GaAs), indium phosphide (InP), etc.

FIG. 1 is a block diagram depicting at least a portion of an illustrative IC 100 having standard ESD protection. IC 100 includes two signal pads, which may be input/output (IO) pads 101 and 102, coupled to a host circuit 107 to be protected from an ESD event. IO pads 101 and 102, in conjunction with corresponding internal connection buses 103 and 104, respectively, provide an interface for transmission and/or reception of signals between the host circuit 107 and other systems and circuitry (not shown) which may be external to the IC. For example one or more of IO pads 101 and 102 may be used to supply a voltage (e.g., VDD) to the host circuit 107. IC 100 further includes a current return pad, which may be ground pad 109, connected to a common ground bus 108 for providing a current return path in the IC.

Internal circuit nodes connected to IO pads 101 and 102 are protected from the ESD event by ESD protection circuits, 105 and 106, respectively, directly connected between the corresponding IO pads and ground pad 109. This arrangement allows the ESD protection circuits 105 and 106 to dissipate a static charge to ground, such that the transient voltage associated with the ESD event does not discharge through, and thereby damage, the host circuit 107. As previously stated, one disadvantage of most conventional ESD protection circuits is that, even when turned off, the ESD protection circuit remains coupled to the host circuit to be protected. As such, parasitic elements in the ESD protection circuit can adversely impact the operation and performance of the host circuit, such as, for example, via parasitic loading, etc., of one or more input and/or output nodes in the host circuit.

One way to reduce the impact of the ESD protection circuit on the host circuit to be protected is to electrically isolate the ESD protection circuit from the host circuit during normal operation of the host circuit (e.g., in the absence of an ESD event), such as, for example, by physically disconnecting the ESD protection circuit from the host circuit during normal operation and physically connecting the ESD protection circuit to the host circuit in response to a trigger event, namely, the ESD event. In this manner, the ESD protection circuit will be essentially transparent with respect to the host circuit during normal operation of the host circuit, at least in terms of parasitic loading effects, and will provide protection to the host circuit when an ESD event occurs.

Figure 2:
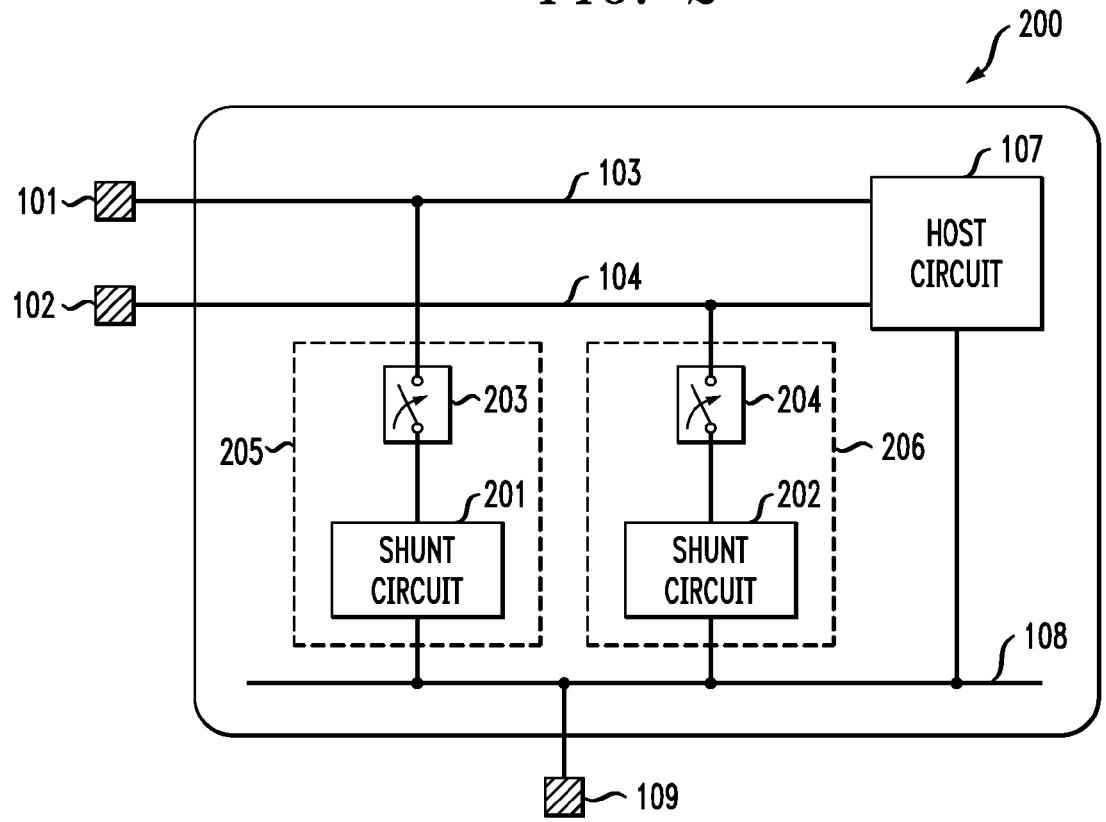
FIG. 2 is a block diagram depicting at least a portion of an exemplary IC including ESD protection according to an embodiment of the present invention.

FIG. 2 is a block diagram depicting at least a portion of an exemplary IC 200 including ESD protection circuitry formed in accordance with an embodiment of the invention. Like IC 100 shown in FIG. 1, IC 200 comprises a plurality of signal pads, which may be IO pads 101 and 102, coupled to a host circuit 107 in the IC. IO pads 101 and 102, in conjunction with corresponding internal connection buses 103 and 104, respectively, provide an interface for transmission and/or reception of signals between host circuit 107 and other systems and circuitry (not shown) external to the IC 200. For example one or more of IO pads 101 and 102 may be used to supply a voltage (e.g., VDD) to the host circuit 107. IC 200 further includes a power pad 109, which may be a current return pad, connected to a common power bus 108 for supplying a voltage source or for providing a current return path in the IC. In this embodiment, power bus 108 is the internal connection bus that also supplies power to host circuit 107. In alternative embodiments, a separate bus may be employed for ESD protection circuitry and for host circuit 107. Host circuit 107 represents a circuit to be protected from damage resulting from an ESD event occurring on one or both of connection buses 103 and 104 via IO pads 101 and 102, respectively.

Internal circuit nodes connected to IO pads 101 and 102 are protected from an ESD event by ESD protection circuits, 205 and 206, respectively, coupled between the corresponding IO pads and power pad 109. Thus, each IO pad includes at least one corresponding ESD protection circuit associated therewith. The term "ESD protection circuit" is intended to broadly comprise any circuit or device (e.g., discharge circuit) operative to dissipate the charge from an ESD event, thereby protecting the host circuit. The host circuit node that the ESD protection circuit connects to is typically an input node or an output node of the IC 200. It is to be understood that although two IO pads and corresponding ESD protection circuits are shown in the figure, the invention is not limited to any particular number of IO pads and ESD protection circuits. Furthermore, more than one ESD protection circuit may be employed for a given IO pad.

Each of ESD protection circuits 205 and 206 preferably comprises an ESD shunt circuit, 201 and 202, respectively. Suitable shunt circuits for use with the present invention may include, for example, diodes, transistors, etc. Instead of being connected directly to the connection buses 103 and 104, the ESD protection circuits 205 and 206 include first and second switch elements, 203 and 204, respectively, for selectively connecting the ESD shunt circuits to their corresponding connection buses. More particularly, first switch element 203 in ESD protection circuit 205 includes a first terminal (contact) connected to shunt circuit 201 and a second terminal connected to connection bus 103. Similarly, second switch element 204 in ESD protection circuit 206 includes a first terminal connected to shunt circuit 202 and a second terminal connected to connection bus 104. This circuit arrangement allows ESD protection circuits 205, 206 to be selectively disconnected from the host circuit 107 during normal operation of the host circuit (e.g., in the absence of an ESD event). For example, shunt circuit 201 may comprise a metal-oxide-semiconductor (MOS) transistor having a drain adapted for connection to switch element 203, a source adapted for connection to power bus 108 and a gate adapted for connection to IO pad 101 for detecting the presence of the ESD event.

Each of the switch elements 203 and 204 preferably comprises a MEMS switch. In general, a MEMS device is a structure fabricated with the integration of one or more mechanical elements, such as, but not limited to, switches, sensors and actuators, and electronics on a common silicon substrate through micro-fabrication technology. A MEMS switch is operative to switch electrical current through mechanical contacts. The micro-mechanical components of the MEMS device are fabricated using micro-machining processes that selectively etch away parts of the silicon wafer or add new structural layers. MEMS devices can be fabricated on silicon, or alternative substrates using a fabrication process compatible with standard complimentary metal-oxide-semiconductor (CMOS) IC technology. Consequently, the inclusion of MEMS switches in the ESD protection circuit does not significantly add to the overall cost of the IC.

In terms of its operation, a MEMS switch, when activated, behaves in a manner consistent with a standard single-pole-single-throw (SPST) switch. MEMS switches can be electrostatically activated. This approach is ultra low power because typically only about a nano-joule of power is required for a switching event (e.g., to open or close contact structures in MEMS switch) and no power is consumed when the MEMS switch is in the closed or open state. Specifically, the MEMS switch will connect a node in the host circuit to an ESD shunt circuit when the switch is in the closed state, and will disconnect the ESD shunt circuit from the host circuit when the MEMS switch is in the open state. The MEMS switch operates in the open state when an ESD event is not occurring. When an ESD event occurs, the event causes the switch to close. After the ESD event has ended, the MEMS switch reopens. Thus, when an ESD event is not occurring, the ESD protection circuit is physically disconnected from the host circuit by the MEMS switch, as previously explained.

More particularly, when an ESD event charges a given IO pad, for example IO pad 101, an electric charge will begin to flow into the IO pad causing a current surge into or out of the IO pad, depending on the polarity of the charge. This charge propagates to the corresponding MEMS switch 203 connected to the given IO pad 101 causing contact structures in the MEMS switch to close, thereby shunting the ESD current through the corresponding ESD shunt circuit 201 to the power bus 108. The current in the bus will dissipate through the power pad 109. Placement of the MEMS switch 203 and ESD shunt circuit 201, especially as it relates to the protected IO pad 101, power bus 108 and power pad 109, is preferably configured so as to shunt the ESD current to the power pad before it reaches the protected host circuit 107.

Unfortunately, MEMS switches are prone to a failure mode involving what is often referred to as "stiction." In the context of micro-machining, in-use stiction may occur during operation when two microstructures come into contact with one another, either intentionally or accidentally. In this instance, surface adhesion forces are higher than the mechanical restoring force of the microstructure. The two microstructures pressing against each other (but not sliding) will require some threshold of force parallel to the surface of contact in order to overcome static cohesion. Stiction is a threshold, not a continuous force. In-use stiction may be caused by capillary forces, Van der Waals forces, electrostatic attraction, direct chemical bonding, etc.

As it pertains to MEMS switches in particular, stiction causes contact structures in the MEMS switch to fail to release (e.g., stick together) when there is no external force holding them together; it is therefore a failure mode in which the contact structures in the MEMS switch do not open when they should. In accordance with an aspect of the invention, in order to overcome stiction, one or more contact structures in the MEMS switch in each of the ESD protection circuits 105 and 106 beneficially includes a surface coating thereon adapted to reduce contact adhesion, as will be described in further detail herein below.

Figure 3:
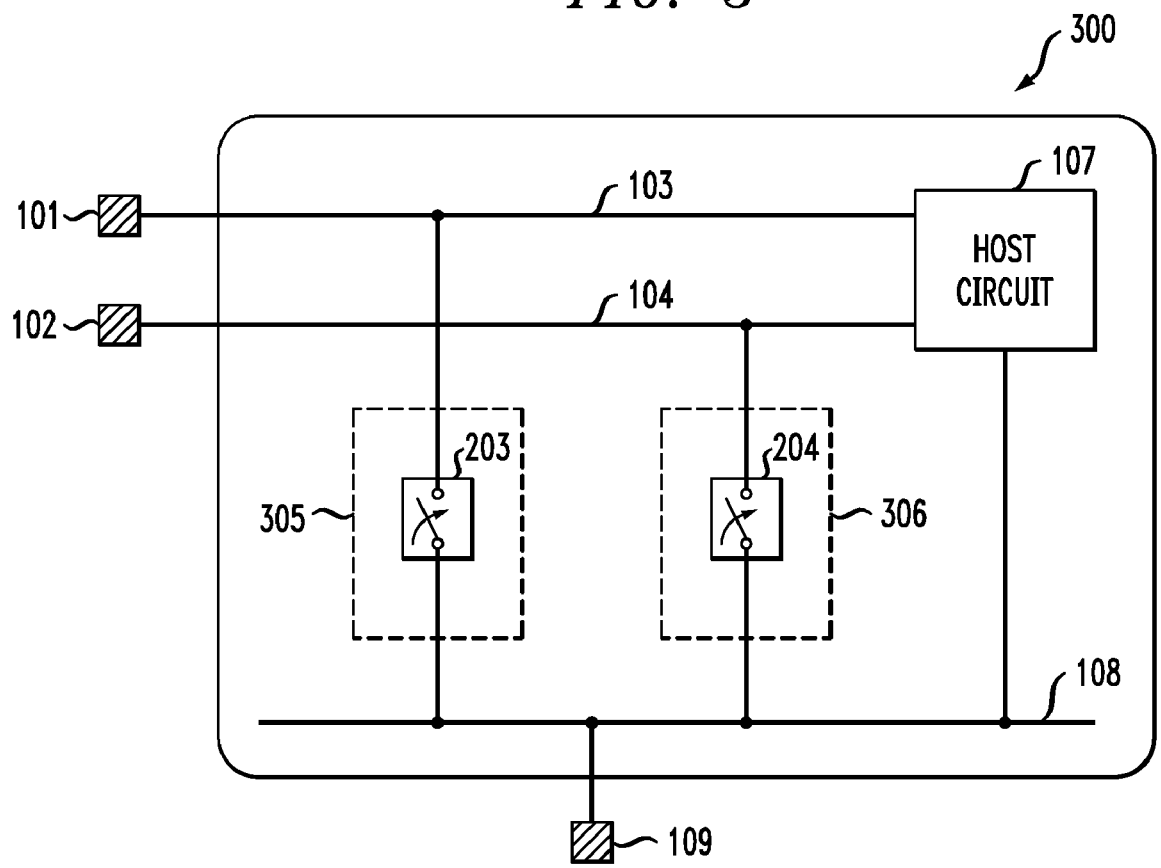
FIG. 3 is a block diagram depicting at least a portion of an exemplary IC including ESD protection according to another embodiment of the present invention.

FIG. 3 is a block diagram depicting at least a portion of an exemplary IC 300 including ESD protection, according to another embodiment of the present invention. Like IC 200 shown in FIG. 2, IC 300 comprises a plurality of signal pads, which may be IO pads 101 and 102, coupled to a host circuit 107 in the IC. IO pads 101 and 102, in conjunction with corresponding internal connection buses 103 and 104, respectively, provide an interface for transmission and/or reception of signals between host circuit 107 and other systems and circuitry (not shown) external to IC 300. For example one or more of IO pads 101 and 102 may be used to supply a voltage (e.g., VDD) to the host circuit 107. IC 300 further includes a power pad 109, which may be a current return pad, connected to a common power bus 108 for supplying a voltage source or for providing a current return path in the IC.

Internal circuit nodes connected to IO pads 101 and 102 are protected from an ESD event by ESD protection circuits, 305 and 306, respectively, coupled between the corresponding IO pads and power pad 109. Thus, each IO pad includes at least one corresponding ESD protection circuit associated therewith. It is to be understood that although two IO pads and corresponding ESD protection circuits are shown in the figure, the invention is not limited to any particular number of IO pads and ESD protection circuits. Furthermore, more than one ESD protection circuit may be employed for a given IO pad.

Each of ESD protection circuits 305 and 306 preferably comprises a switch element, 203 and 204, respectively, coupled between a corresponding internal connection bus and common power bus 108. More particularly, switch element 203 includes a first terminal coupled to connection bus 103 and a second terminal coupled to common power bus 108, and switch element 204 includes a first terminal coupled to connection bus 104 and a second terminal coupled to the common power bus. In this embodiment, the switch element itself functions to shunt current generated during an ESD event, and therefore the ESD shunt circuits 201 and 202 depicted in FIG. 2 have been eliminated. Each of the switch elements 203 and 204 preferably comprises a MEMS switch. Moreover, in a manner consistent with switch elements 203 and 204 depicted in FIG. 2, one or more contact structures of the MEMS switches in ESD protection circuits 305 and 306 preferably includes a surface coating thereon adapted to reduce contact adhesion, thereby reducing the likelihood that stiction will occur.

When an ESD event charges a given IO pad, for example IO pad 101, an electric charge will begin to flow into the IO pad causing a current surge into or out of the IO pad, depending on the polarity of the charge. This charge propagates to the corresponding MEMS switch 203 connected to the given IO pad 101 via connection bus 103 causing contact structures in the MEMS switch to close, thereby shunting the ESD current through the MEMS switch to the power bus 108. The current in the bus will dissipate through the power pad 109. Thus, during the ESD event, contact structures in the MEMS switch 203 will be closed, thereby providing a low-resistance path to shunt the ESD current to ground or an alternative source. During normal operation, the contact structures in the MEMS switch 203 will open (release), thereby disconnecting the ESD protection circuit from the host circuit and eliminating parasitic loading otherwise attributable to the ESD protection circuitry.

Placement of the MEMS switch 203 in relation to the protected IO pad 101, power bus 108 and power pad 109, is preferably configured so as to shunt the ESD current to the power pad before it reaches the protected host circuit 107. Because the ESD current is shunted by a low resistance path directly to the power bus 108 and power terminal 109, very little heat is dissipated in the silicon, and consequently silicon damage is unlikely to occur.

Figure 4:
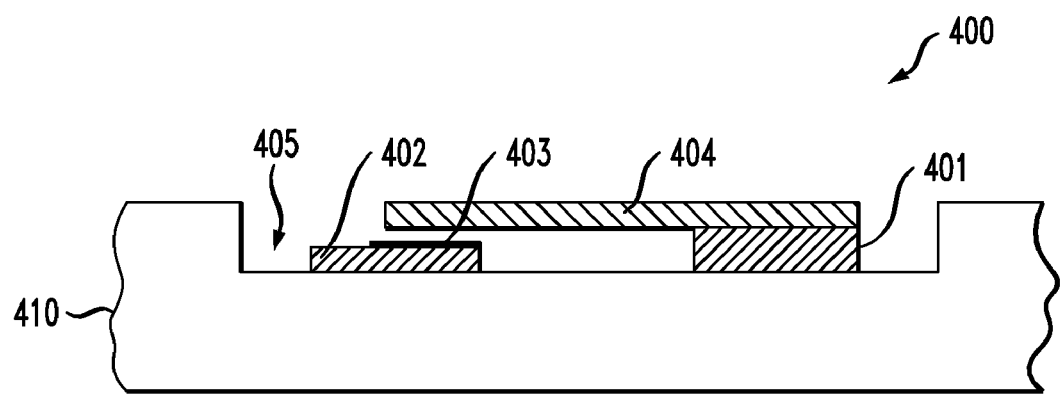
FIG. 4 is a cross-sectional view depicting at least a portion of an exemplary MEMS switch, formed in accordance with an aspect of the present invention.

A switch element, such as a MEMS switch, suitable for use with the present invention may be formed using standard CMOS IC fabrication techniques. With reference to FIG. 4, a cross-sectional view of at least a portion of an exemplary MEMS switch 400 is shown, in accordance with an embodiment of the invention. MEMS switch 400 is fabricated on a substrate 410, preferably a silicon substrate although not limited thereto, and comprises at least first and second contact structures. The first contact structure comprises a movable contact arm 404, also referred to as a cantilever, and a support pedestal 401 upon which the contact arm is formed. In the embodiment shown, the second contact structure comprises a substantially fixed electrode 402. Movement of the contact arm 404 can be controlled by a variety of means, including, but not limited to, electrostatic, capacitive and piezoelectric. Preferably, movement of the contact arm 404 is caused by an applied electrostatic force generated by a voltage difference between contact arm 404 and electrode 402. It is to be understood that various alternative configurations for forming a MEMS switch are contemplated by the invention, as will become apparent to those skilled in the art given the teachings herein. For example, in another embodiment of the invention, rather than the second contact structure being substantially fixed, both the first and second contact structures may comprise a movable contact arm.

In the absence of a deflecting force, which may be defined as an "off" state of the MEMS switch 400, the first and second contact structures are physically and electrically isolated from one another. In an "on" state of the MEMS switch 400, contact arm 404 is positioned so as to be in physical and electrical contact with electrode 402. Both the first and second contact structures are preferably formed of a conductive material (e.g., aluminum, gold, etc.) or a semi-conductive material (e.g., silicon, germanium, etc.). In a preferred embodiment, at least one of the first and second contact structures comprises silicon. Accordingly, in the "on" state, a current may pass between the contacting arm 404 and the electrode 402, while in the "off" state, no current may pass between the contacting arm and the electrode.

More particularly, support pedestal 401 is formed on at least a portion of an upper surface of substrate 410. Electrode 402 is also formed on the upper surface of substrate 410 and is spaced laterally from pedestal 401. Pedestal 401 physically supports contact arm 404. A first (proximal) end of contact arm 404 is formed on at least a portion of an upper surface of pedestal 401 in such a manner that a second (distal) end of the contact arm, opposite the first end, vertically overlays at least a portion of electrode 402. Electrode 402 preferably has a first thickness associated therewith and pedestal 401 has a second thickness associated therewith, the second thickness being greater than the first thickness. Alternatively, electrode 402 can be formed in a trench in substrate 410, so that the second thickness need not be greater than the first thickness. In either case, however, pedestal 401, contact arm 404 and electrode 402 are arranged such that the distal end of the contact arm, in the absence of a deflecting force, is suspended above the electrode without being in physical or electrical contact with the electrode. Optionally, MEMS switch 400 may be formed in a trench 405 in substrate 410 such that the MEMS switch is substantially planar with an upper surface of the surrounding substrate.

As previously stated, when the first and second contact structures of the MEMS switch 400 come into physical contact with one another, they will require a large force to separate due to stiction. Therefore, a passivation layer 403, or alternative interceding layer (e.g., surface coating), is formed on at least one of the contacting surfaces, namely, an upper surface of electrode 402 (as shown) and/or a bottom surface of contacting arm 404. The material used in forming the passivation layer 403 must be able to conduct current so that the MEMS switch 400 can work as designed. Preferably, passivation layer 403 comprises silicon dioxide, although alternative materials may be similarly employed (e.g., silicon nitride, etc.). Silicon dioxide is preferred due its low cost and the fact that its thickness can be precisely controlled using standard fabrication techniques. Thus, the contacting surfaces of the first and second contact structures do not directly contact one another. Rather, coupling between the contact arm 404 and the electrode 402 is through the passivation layer 403.

Although bulk silicon dioxide is traditionally considered to be an insulator, tunneling currents (e.g., about ten amperes) in thin silicon dioxide can be suitably large (particularly in view of the magnitude of current associated with an ESD event) when there are a sufficient number of defects present in the passivation layer 403 (e.g., above a prescribed defect density). The exact number of defects is not critical. All that is important is that the passivation layer be capable of conducting enough current to shunt the ESD event. It has been shown that a defect density of about $4 \times 10^6$ defects per square centimeter (defects/cm$^2$) or greater is sufficient, although the invention is not limited to this particular defect density. A passivation layer comprising a silicon dioxide coating of approximately ten angstroms (A) in cross-sectional thickness is appropriately thin, although the invention is not limited to this specific thickness. In accordance with an aspect of the invention, the desired defects in the silicon dioxide passivation layer 403 can be introduced by applying an external electric field of a prescribed magnitude (e.g., about $5 \times 10^9$ volts/meter or higher) to the IC once during fabrication. The well-known inversely proportional electric field or 1/E model can also be used to estimate a breakdown voltage.

In terms of an illustrative operation of MEMS switch 400, when the voltage difference between contact arm 404 and electrode 402 is less than a prescribed maximum operating voltage of the host circuit (e.g., twice Vdd), contact arm 404 will not be deflected downward and MEMS switch 400 will remain in an "off" (open) state. When the voltage difference between contact arm 404 and electrode 402 is greater than the maximum operating voltage of the host circuit but less than a voltage level at which damage to the host circuit is likely to occur, the contact arm 404 deflects downward contacting electrode 402 through passivation layer 403 and the switch is in an "on" (closed) state. In a preferred embodiment, the voltage potential for causing a deflection of the contact arm 404 large enough for the contact arm to electrically contact electrode 402 is at least twice the magnitude of the operating voltage of the host circuit formed within the semiconductor substrate. Because contact arm 404 and electrode 402 are only electrically coupled together rather than in direct physical contact with one another, stiction is eliminated in MEMS switch 400 and the contact arm 404 moves back to the "off" state position once the voltage difference drops below the prescribed maximum operating voltage of the host circuit.

Figure 5:
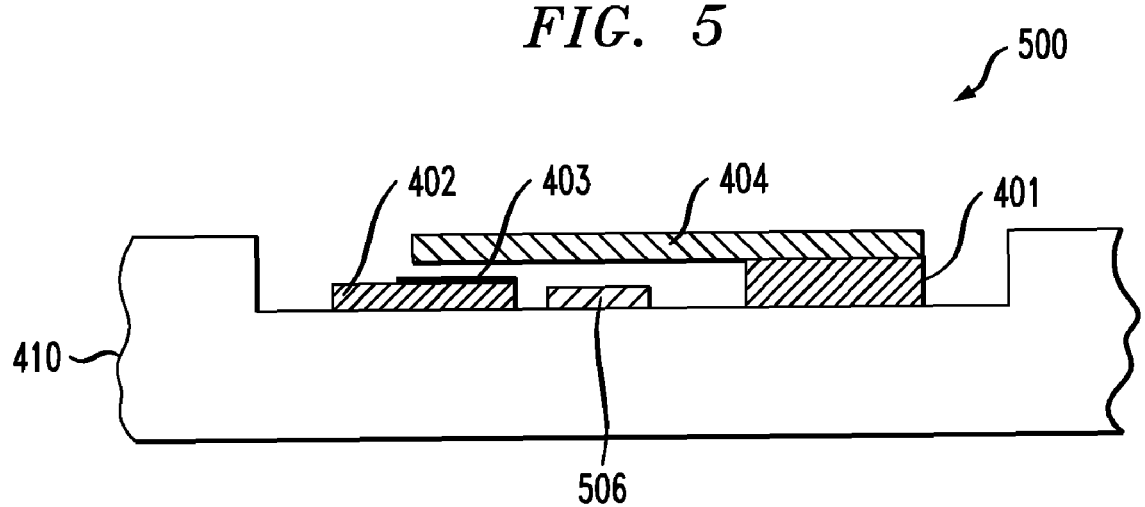
FIG. 5 is a cross-sectional view depicting at least a portion of an exemplary MEMS switch, formed in accordance with another aspect of the present invention.

FIG. 5 is a cross-sectional view depicting at least a portion of an exemplary MEMS switch 500, formed in accordance with another embodiment of the invention. MEMS switch 500 is fabricated on silicon substrate 410 and, like MEMS switch 400 shown in FIG. 4, comprises at least first and second contact structures. The first contact structure comprises a movable contact arm 404, which may be referred to as a cantilever, and a support pedestal 401 upon which the contact arm is formed. In the embodiment shown, the second contact structure comprises a substantially fixed electrode 402. Preferably, movement of the contact arm 404 is caused by an electrostatic force generated by a voltage difference between contact arm 404 and electrode 402. Both of the first and second contact structures are preferably formed of a conductive material (e.g., aluminum, gold, etc.) or a semi-conductive material (e.g., silicon, germanium, etc.).

Electrode 402 and support pedestal 401 are formed on an upper surface of substrate 410 and are spaced laterally apart relative to one another. Support pedestal 401 physically supports a proximal end of contact arm 404, while a distal end of the contact arm, opposite the proximal end, overlays at least a portion of electrode 402. Contact arm 404 is not in physical or electrical contact with electrode 402 in the absence of an ESD event (or alternative high-voltage triggering event). MEMS switch 500 further comprises a control structure 506 formed on the upper surface of substrate 410 between electrode 402 and support pedestal 401. A voltage potential of a prescribed magnitude is preferably applied to control structure 506 to generate an electrostatic deflecting force on contact arm 404 sufficient to move contact arm 404 downward so as to make electrical contact with electrode 402.

In a manner consistent with MEMS switch 400 shown in FIG. 4, on at least one of the surfaces of electrode 402 and contact arm 404 which contact one another, a passivation layer 403 is preferably formed. Specifically, passivation layer 403 may be formed on an upper surface of electrode 402 and/or a bottom surface of the distal end of contact arm 404. In the illustrative embodiment shown in FIG. 5, passivation layer 403 is formed on the upper surface of electrode 402 in MEMS switch 500. Passivation layer 403 preferably comprises a thin layer (e.g., about a few angstroms thick when viewed in cross section) of silicon dioxide, although alternative materials may be similarly used, including, for example, silicon nitride, etc. The thickness of passivation layer 403 can be substantially thin since the main function of this passivation layer is not to stop current from flowing; thus, concerns about tunneling currents are essentially nonexistent. Depending on the manufacturing technology employed, a passivation layer thickness of about 1 to 2 nanometers should be sufficient. Thus, the contacting surfaces of the first and second contact structures do not directly contact one another. Rather, coupling between contact arm 404 and electrode 402 is through passivation layer 403.

A point to consider is that a surface area of the contact structures should be suitably large. The ESD event will have a substantially fixed current; therefore, if the contact area of the contact structures is relatively small, the current density will be large. This may cause the contact structures to fuse together. However, making the contact area suitably large will reduce the likelihood that the contact structures will fuse together.

In terms of an illustrative operation of MEMS switch 500, when a voltage difference between contact arm 404 and electrode 402 is less than a prescribed maximum operating voltage of the host circuit (e.g., Vdd+ten percent), contact arm 404 will not be deflected downward and MEMS switch 500 will remain in an "off" (open) state. When the voltage difference between contact arm 404 and electrode 402 is greater than the maximum operating voltage of the host circuit but less than a voltage level at which damage to the host circuit is likely to occur, the contact arm 404 deflects downward contacting electrode 402 through passivation layer 403 and the switch is in an "on" (closed) state. Because contact arm 404 and electrode 402 are only electrically coupled together rather than in direct physical contact with one another, stiction is eliminated in MEMS switch 500 and the contact arm 404 moves back to the "off" state position once the voltage difference drops below the prescribed maximum operating voltage of the host circuit.

Embodiments of the present invention provide, among other advantages, a substantially reduced interaction between parasitic elements in ESD protection circuitry and one or more nodes in a corresponding host circuit that are being protected from an ESD event. There remains a very small, essentially insignificant capacitance associated with connections to the switch element within the ESD protection circuit from the protected nodes and associated with the small capacitance of the coupled contact of the switch. These capacitances are small (e.g., about a few to a few tens of femtofarad (fF) or less) and easily modeled for simulation purposes. Thus, an additional advantage of the present invention is the ability to model and simulate the parasitic elements on the protected nodes caused by ESD protection. Another advantage of the present invention is that the current generated by the ESD event can be shunted directly to a power supply essentially without passing through heat generating ESD protection components (e.g., diode, transistor, etc.). This avoids damage to the surrounding silicon and to the ESD protection circuit and avoids possible irreversible shorting of the ESD protected node to another node or power supply connection.

The switch element of the present invention, illustrative embodiments of which have been described herein, has beneficial applications other than ESD protection. For example, a switch element according to an aspect of the invention can advantageously be used as an electronic switch where it has advantages over conventional transistor switches. Specifically, the switch element of the invention can be used to switch voltages that are too high to be safely switched by a transistor without damaging the transistor. The switch element according to the invention can also be used to selectively connect and disconnect chip-level circuit blocks, or to disconnect bulk CMOS transistors from a substrate of the IC so as to eliminate latch-up issues in the IC, among other beneficial applications.

Figure 6:
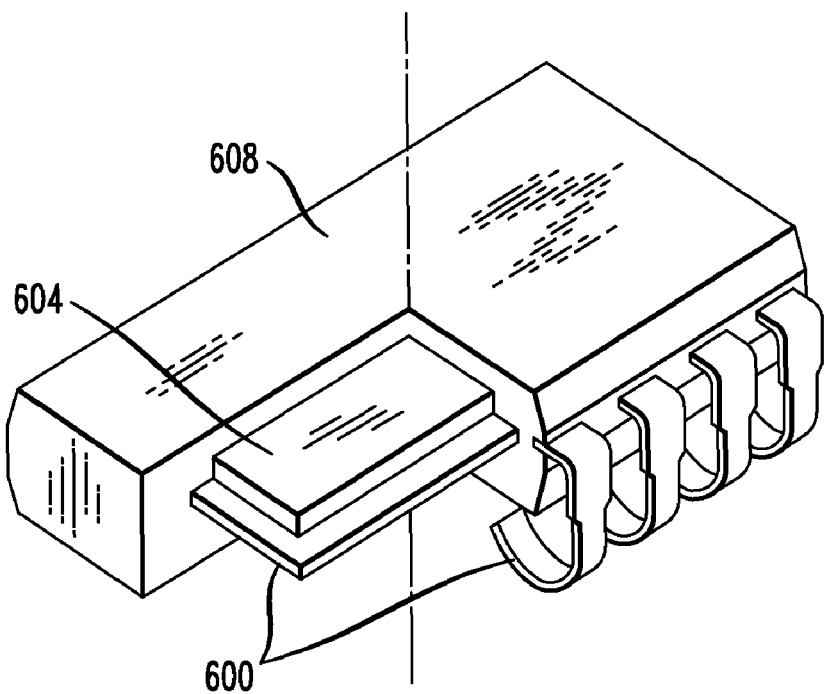
FIG. 6 is a partial sectional view depicting a packaged IC according to an embodiment of the present invention.

At least a portion of the circuits and methodologies of the present invention may be implemented in one or more ICs. In forming ICs, die are typically fabricated in a repeated pattern on a surface of a semiconductor wafer. Each of the die includes a device described herein, and may include other structures or circuits. Individual die are cut or diced from the wafer, then packaged as integrated circuits. FIG. 6 is a partial sectional view depicting a packaged IC embodying a circuit consistent with FIGS. 2 through 5, in accordance with an embodiment of the invention. The packaged die comprises a leadframe 600, a die 604 including at least one circuit according to an aspect of the invention, and a plastic encapsulation mold 608. One skilled in the art would know how to dice wafers and package die to produce integrated circuits. Integrated circuits so manufactured are considered part of this invention.

An IC in accordance with the present invention can be employed in various applications and/or electronic systems which utilize ESD protection. Techniques of the invention may also be employed to selectively connect or disconnect circuit blocks on a chip level, or to selectively connect or disconnect bulk CMOS transistors from a substrate of the IC so as eliminate latch-up issues in the IC, among other beneficial applications. Suitable systems for implementing techniques of the invention may include, but are not limited to, personal computers, communication networks, interface networks, etc. Systems incorporating such integrated circuits are considered part of this invention. Given the teachings of the invention provided herein, one of ordinary skill in the art will be able to contemplate other implementations and applications of the techniques of the present invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. An electrostatic discharge (ESD) protection circuit operative to protect a host circuit coupled to a signal pad from an ESD event occurring at the signal pad, the ESD protection circuit comprising;
    at least one micro electro-mechanical systems (MEMS) switch coupled to the signal pad during the ESD event;
    wherein the at least one MEMS switch comprises first and second contact structures, the first contact structure being adapted for connection to the signal pad, the second contact structure being adapted for connection to a voltage supply source, the first and second contact structures being electrically coupled together during the ESD event for shunting a current generated during the ESD event from the signal pad to the voltage supply source, the first and second contact structures being electrically isolated from one another in the absence of the ESD event, wherein at least one of the first and second contact structures comprises a passivation layer for reducing contact adhesion between the first and second contact structures, current generated during the ESD event being shunted between the first and second contact structures through the passivation layer.

2. The ESD protection circuit of claim 1, further comprising at least one shunt circuit coupled between the at least one MEMS switch and the voltage supply source, the at least one shunt circuit being operative to dissipate the current generated during the ESD event.

3. An electrostatic discharge (ESD) protection circuit operative to protect a host circuit coupled to a signal pad from an ESD event occurring at the signal pad, the ESD protection circuit comprising:
    at least one micro electro-mechanical systems (MEMS) switch coupled to the signal pad during the ESD event, the at least one MEMS switch comprising first and second contact structures, the first contact structure being adapted for connection to the signal pad, the second con adasted for connection to a voltage supply source the and second contact structures being electrically coupled together during the ESD event for shunting a current generated during the ESD event from the signal pad to the voltage supply source, the first and second contact structures being electrically isolated from one another in the absence of the ESD event, wherein at least one of the first and second contact structures comprises a passivation layer for reducing contact adhesion between the first and second contact structures; and
    at least one shunt circuit coupled between the at least one MEMS switch and the voltage supply source, the at least one shunt circuit being operative to dissipate the current generated during the ESD event;
    wherein the at least one shunt circuit comprises a metal-oxide-semiconductor (MOS) transistor having a drain adapted for connection to the at least one MEMS switch, a source adapted for connection to the voltage supply source, and a gate adapted for connection to the signal pad for activating the MOS transistor in response to the ESD event.

4. The ESD protection circuit of claim 1, wherein the first and second contact structures are formed on a semiconductor substrate, the first contact structure comprising a pedestal formed on an upper surface of the substrate and a movable contact arm, a proximal end of the contact arm being formed on at least a portion of an upper surface of the pedestal, the second contact structure comprising an electrode formed on the upper surface of the substrate and being spaced laterally relative to the pedestal, a distal end of the contact arm opposite the proximal end overlaying at least a portion of the electrode, the at least one MEMS switch being configured such that the contact arm, in the absence of a deflecting force, is suspended above the electrode without being in physical or electrical contact with the electrode.

5. The ESD protection circuit of claim 4, wherein the at least one MEMS switch further comprises a control structure formed on the upper surface of the substrate between the electrode and pedestal, a force for moving the contact arm to thereby selectively open and close the MEMS switch being generated as a function of a voltage difference between a first voltage applied to the control structure and a second voltage applied to the contact arm.

6. The ESD protection circuit of claim 1, wherein at least one of the first and second contact structures comprises silicon.

7. The ESI) protection circuit of claim 1, wherein the passivation layer comprises silicon dioxide, the passivation layer being configured such that a conduction of current through the passivation layer is accomplished by tunnelling.

8. The ESD protection circuit of claim 1, wherein the passivation layer comprises silicon dioxide having a prescribed cross-sectional thickness and impurity density so as to permit conduction of current through the passivation layer during the ESD event.

9. The ESD protection circuit of claim 1, wherein the at least one MEMS switch is activated by an electrostatic force generated as a function of a magnitude of a voltage present at the signal pad.

10. The ESD protection circuit of claim 1, wherein a cross-sectional thickness of the passivation layer is less than about ten angstroms.

11. A micro electro-mechanical systems (MEMS) switch, comprising:
    a first contact structure; and
    a second contact structure, the first and second contact structures being electrically coupled together in response to at least one of an applied electrostatic, capacitive and piezoelectric force;
    wherein the first and second contact structures, upon application of the at least one of the electrostatic, capacitive and piezoelectric force greater than a prescribed level, are operative to permit conduction of current between the first and second contact structures, wherein at least one of the first and second contact structures comprises a passivation layer formed thereon, the passivation layer being adapted to reduce contact adhesion between the first and second contact structures, and wherein the current between the first and second contact structures is conducted through the passivation layer.

12. The MEMS switch of claim 11, wherein at least one of the first and second contact structures comprises silicon.

13. The MEMS switch of claim 11, wherein the passivation layer comprises silicon-dioxide having a prescribed cross-sectional thickness and impurity density so as to permit conduction of current through the passivation layer during application of the at least one of the electrostatic, capacitive and piezoelectric force greater than a prescribed level.

14. The MEMS switch of claim 11, wherein current passes through the switch during application of the at least one of the electrostatic, capacitive and piezoelectric force greater than a prescribed level by tunnelling through the passivation layer.

15. The MEMS switch of claim 11, wherein the first and second contact structures are formed on a semiconductor substrate, the first contact structure comprising a pedestal formed on an upper surface of the substrate and a movable contact arm, a proximal end of the contact arm being formed on at least a portion of an upper surface of the pedestal, the second contact structure comprising an electrode formed on the upper surface of the substrate and being spaced laterally relative to the pedestal, a distal end of the contact arm opposite the proximal end overlaying at least a portion of the electrode, the MEMS switch being configured such that the contact arm, in the absence of a deflecting force, is suspended above the electrode without being in physical or electrical contact with the electrode.

16. The MEMS switch of claim 15, wherein the deflecting force is an electrostatic force generated as a function of a difference in voltage potential between the first and second contacts.

17. The MEMS switch of claim 15, further comprising a control structure, wherein the control structure formed on the upper surface of the substrate between the electrode and the pedestal, a force for moving the contact arm to thereby selectively open and close the MEMS switch being generated as a function of a voltage difference between a first voltage applied to the control structure and a second voltage applied to the contact arm.

18. A method for protecting a host circuit coupled to a signal pad from an electrostatic discharge (ESD) event occurring at the signal pad, the method comprising the steps of:
during the ESD event, shunting a current generated during the ESD event from the signal pad to a voltage supply source via at least one micro electromechanical systems (MEMS) switch, the at least one MEMS switch including first and second contact structures electrically coupled together during the ESD event, at least one of the first and second contact structures comprising a passivation layer for reducing contact adhesion between the first and second contact structures, current generated during the ESD event being shunted between the first and second contact structures through the passivation layer; and
electrically isolating the first and second contact structures from one another in absence of the ESD event.

* * * * *

UNITED STATES PATENT AND TRADEMARK OFFICE
CERTIFICATE OF CORRECTION

PATENT NO. : 7,944,655 B2  Page 1 of 1
APPLICATION NO. : 12/128108
DATED : May 17, 2011
INVENTOR(S) : Chen et al.

It is certified that error appears in the above-identified patent and that said Letters Patent is hereby corrected as shown below:

In Claim 3, column 11, line 53, replace "second con" with --second contact structure being--.

In Claim 3, column 11, line 54, replace "adasted for connection to a voltage supply source the and" with --adapted for connection to a voltage supply source, the first and--.

In Claim 7, column 12, line 34, replace "ESI)" with --ESD--.

Signed and Sealed this
Twenty-sixth Day of July, 2011

David J. Kappos
*Director of the United States Patent and Trademark Office*